(12) United States Patent
Araújo et al.

(10) Patent No.: US 11,079,848 B2
(45) Date of Patent: Aug. 3, 2021

(54) GENERATING A HAPTIC MODEL

(71) Applicant: Telefonaktiebolaget LM Ericsson (publ), Stockholm (SE)

(72) Inventors: José Araújo, Stockholm (SE); Lars Andersson, Solna (SE); Soma Tayamon, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 16/467,092

(22) PCT Filed: Dec. 6, 2016

(86) PCT No.: PCT/EP2016/079841
§ 371 (c)(1),
(2) Date: Jun. 6, 2019

(87) PCT Pub. No.: WO2018/103823
PCT Pub. Date: Jun. 14, 2018

(65) Prior Publication Data
US 2019/0310712 A1    Oct. 10, 2019

(51) Int. Cl.
*G06F 3/01* (2006.01)
*G02B 27/01* (2006.01)
*G06F 9/451* (2018.01)

(52) U.S. Cl.
CPC .......... *G06F 3/016* (2013.01); *G02B 27/017* (2013.01); *G06F 3/011* (2013.01); *G06F 3/017* (2013.01); *G06F 9/451* (2018.02)

(58) Field of Classification Search
None
See application file for complete search history.

(56) References Cited

U.S. PATENT DOCUMENTS

2016/0274662 A1* 9/2016 Rimon .................... G06F 3/016

OTHER PUBLICATIONS

Xiao Xu et al., "Point Cloud-Based Model-Mediated Teleoperation With Dynamic and Perception-Based Model Updating", IEEE Transactions on Instrumentation and Measurement, vol. 63, No. 11, Nov. 2014, http://ieeexplore.ieee.org/stamp/stamp.jsp?arnumber=6822645, pp. 2558-2569.

(Continued)

*Primary Examiner* — Rinna Yi
(74) *Attorney, Agent, or Firm* — Sage Patent Group

(57) ABSTRACT

A method is disclosed for generating a haptic model including at least one virtual object which can be presented using both a visual display device and a haptic device to a user. Information of at least one candidate virtual object is obtained, the candidate virtual object including both a haptic representation and a visual representation. For each of the at least one candidate virtual object, reachability data, indicating whether the candidate virtual object is reachable for the user is determined. For each of the at least one candidate virtual object, visibility data, indicating whether the candidate virtual object is visible for the user is determined. A haptic model is generated selectively including at least one candidate virtual object, the inclusion of each candidate virtual object being based on its respective reachability and visibility data. The haptic model is provided to be rendered.

14 Claims, 2 Drawing Sheets

(56) References Cited

OTHER PUBLICATIONS

Claudio Pacchierotti et al., "Cutaneous Feedback of Fingertip Deformation and Vibration for Palpation in Robotic Surgery", IEEE Transactions on Biomedical Engineering, vol. 63, No. 2, Feb. 2016, pp. 278-287.
International Search Report and Written Opinion of the International Searching Authority, PCT/EP2016/079841, dated Jun. 16, 2017, 17 pages.
Ferran Argelaguet et al: "A survey of 3D object selection techniques for virtual environments", Computers & Graphics, vol. 37, No. 3, May 1, 2013, XP055147239, pp. 121-136.
Kaisa Väänänen-Vainio-Mattila et al., "User Experience and Usage Scenarios of Audio-Tactile Interaction with Virtual Objects in a Physical Environment", DPPI 2013, Praxis and Poetics, Newcastle upon Tyne, UK, Sep. 3-5, 2013, XP055376819, pp. 67-76.
Kiron Lebeck et al., "How to Safely Augment: Reality: Challenges and Directions", Feb. 23, 2016, University of Washington, XP058079944, 6 Pages.

\* cited by examiner

GENERATING A HAPTIC MODEL

CROSS REFERENCE TO RELATED APPLICATIONS

This application is a 35 U.S.C. § 371 national stage application of PCT International Application No. PCT/EP2016/079841 filed on Dec. 6, 2016, the disclosure and content of which is incorporated by reference herein in its entirety.

TECHNICAL FIELD

The present disclosure relates to a method, haptic model generators, a server, a user device, a computer program and a computer program product for generating a haptic model comprising at least one virtual object.

BACKGROUND

Augmented reality (AR) is foreseen to become an integral technology in the networked society and potently disrupt the consumer electronics market. AR is here used to denote the concept of presenting a combination of real-world objects and computer-rendered content to a user. Specifically, one implementation of AR implies layering one or more virtual objects on top of reality, on a user's view of the world via a see-through Head Mounted Display (HMD). One application of AR is to allow users to see and interact remotely and in 3D (three dimension), as if each participant share the same physical space. Hence, remote communication and interaction could become as natural as face-to-face communication.

A popular example of AR is the 2016 phenomenon of Pokemon Go, which has truly put forward the advantages of AR in the way people interact with each other and with video games.

In 2016, Microsoft launched Hololens, a mobile AR HMD. Several other HMDs are being launched by other companies including Meta and Magic Leap, which are set to improve the AR technology even further.

In Virtual reality (VR) a user is immersed in a virtual environment where all content is virtual. Some of VR applications are gaming, 360 degree live video consumption of concerts, sports, etc., educational and training purposes, among others. VR content is displayed via a non-see-through HMD as, e.g., the Oculus Rift, HTC Vive, Google Daydream or Samsung GearVR.

Even though AR and VR technology has improved in the last years, full immersion cannot be achieved if users cannot feel the virtual content. Several haptic devices are currently being developed, in particularly for AR and VR applications. Haptic perception comprises kinesthetic and tactile sense and relates to the sensation of the size, shape, mass, texture and stiffness of physical objects, surfaces, etc. Kinesthetic information refers to the information perceived when moving joints, muscles and tendons, while tactile information refers to information retrieved via the skin. By utilizing devices with kinesthetic and/or tactile actuators, a user is able to perceive all the above properties of objects. A haptic model is generally a 2D or 3D model comprising geometric and physical characteristics of an object or environment. The geometric component can be encoded in an 2D or 3D image, where for each pixel or a group of pixels (voxels for the 3D case), are encoded with physical properties of the object such as texture, friction, stiffness, temperature, etc.

Such haptic devices will allow the user to perceive geometric and physical properties of the virtual content such as the size, form, weight, texture, friction, stiffness, and temperature. The proposed devices are mobile and able to be worn by the user e.g. as hand/finger-worn, complete gloves, vests, smartwatches, and even exoskeletons. Handheld devices such as smartphones and tables are also being enabled with basic haptic feedback capabilities.

AR and VR applications with haptic feedback are very computationally intensive. It would be of great benefit if the resource requirements for such applications could be reduced.

SUMMARY

It is an object to reduce processing required for generation of a haptic model comprising at least one virtual object, without significantly impacting user experience.

According to a first aspect, it is presented a method for generating a haptic model including at least one virtual object which can be presented using both a visual display device and a haptic device to a user. The method is performed by a haptic model generator and comprises the steps of: obtaining information of at least one candidate virtual object, wherein the candidate virtual object includes both a haptic representation and a visual representation; determining, for each one of the at least one candidate virtual object, reachability data, indicating whether the candidate virtual object is reachable for the user; determining, for each one of the at least one candidate virtual object, visibility data, indicating whether the candidate virtual object is visible for the user; generating a haptic model selectively comprising at least one candidate virtual object, the inclusion of each candidate virtual object being based on its respective reachability data and visibility data; and providing the haptic model to be rendered by the haptic device.

The step of determining visibility data may comprise determining any candidate virtual object to be not visible which would be visually blocked by a real-world object situated between the user and the perceived position of the candidate virtual object.

A frequency of performing the method may be based on a position of the user.

The step of generating a haptic model may comprise generating a model which excludes all candidate virtual objects which are considered unreachable.

The step of generating a haptic model may comprise generating a model which excludes all candidate virtual objects which are considered not visible.

The step of generating a haptic model may comprise generating a model which excludes candidate virtual objects which are not considered to be in focus for the user.

The step of determining reachability data may be based on an orientation and position of a limb of the user, experiencing the haptic device, in relation to the candidate virtual object.

The step of determining reachability data may be based on a direction of movement of a limb of the user experiencing the haptic device, in relation to the candidate virtual object.

The step of determining reachability data may be based on how dynamic a movement of the limb of the user, experiencing the haptic device, is.

The step of determining reachability data may be based on how dynamic a movement of the candidate virtual object is.

The step of determining reachability data may be based on a detected activity of the user.

The haptic model generator may be provided in a server.

The haptic model generator may be provided in a user device comprising the haptic device.

According to a second aspect, it is presented a haptic model generator for generating a haptic model including at least one virtual object which can be presented using both a visual display device and a haptic device to a user. The haptic model generator comprises: a processor; and a memory storing instructions that, when executed by the processor, cause the haptic model generator to: obtain information of at least one candidate virtual object, wherein the candidate virtual object includes both a haptic representation and a visual representation; determine, for each one of the at least one candidate virtual object, reachability data, indicating whether the candidate virtual object is reachable for the user; determine, for each one of the at least one candidate virtual object, visibility data, indicating whether the candidate virtual object is visible for the user; generate a haptic model selectively comprising at least one candidate virtual object, the inclusion of each candidate virtual object being based on its respective reachability data and visibility data; and provide the haptic model to be rendered by the haptic device.

The instructions to determine visibility data may comprise instructions that, when executed by the processor, cause the haptic model generator to determine any candidate virtual object to be not visible which would be visually blocked by a real-world object situated between the user and the perceived position of the candidate virtual object.

The haptic model generator may further comprise instructions that, when executed by the processor, cause the haptic model generator to repeat the execution of instructions at a frequency based on a position of the user.

The instructions to generate a haptic model may comprise instructions that, when executed by the processor, cause the haptic model generator to generate a model which excludes all candidate virtual objects which are considered unreachable.

The instructions to generate a haptic model may comprise instructions that, when executed by the processor, cause the haptic model generator to generate a model which excludes all candidate virtual objects which are considered not visible.

The instructions to generate a haptic model may comprise instructions that, when executed by the processor, cause the haptic model generator to generate a model which excludes candidate virtual objects which are not considered to be in focus for the user.

The instructions to determine reachability data may comprise instructions that, when executed by the processor, cause the haptic model generator to determine reachability data based on an orientation and position of a limb of the user, experiencing the haptic device, in relation to the candidate virtual object.

The instructions to determine reachability data may comprise instructions that, when executed by the processor, cause the haptic model generator to determine reachability data based on a direction of movement of a limb of the user experiencing the haptic device, in relation to the candidate virtual object. The instructions to determine reachability data may comprise instructions that, when executed by the processor, cause the haptic model generator to determine reachability data based on how dynamic a movement of the limb of the user, experiencing the haptic device, is.

The instructions to determine reachability data may comprise instructions that, when executed by the processor, cause the haptic model generator to determine reachability data based on how dynamic a movement of the candidate virtual object is.

The instructions to determine reachability data may comprise instructions that, when executed by the processor, cause the haptic model generator to determine reachability data based on a detected activity of the user.

According to a third aspect, it is presented a haptic model generator comprising: means for obtaining information of at least one candidate virtual object, wherein the candidate virtual object includes both a haptic representation and a visual representation; means for determining, for each one of the at least one candidate virtual object, reachability data, indicating whether the candidate virtual object is reachable for the user; means for determining, for each one of the at least one candidate virtual object, visibility data, indicating whether the candidate virtual object is visible for the user; means for generating a haptic model selectively comprising at least one candidate virtual object, the inclusion of each candidate virtual object being based on its respective reachability data and visibility data, the haptic model including at least one virtual object which can be presented using both a visual display device and a haptic device to a user; and means for providing the haptic model to be rendered by the haptic device.

According to a fourth aspect, it is presented a server comprising the haptic model generator according to the second or third aspects.

According to a fifth aspect, it is presented a user device comprising the haptic model generator according to any one of the second or third aspects. According to a sixth aspect, it is presented a computer program for generating a haptic model including at least one virtual object which can be presented using both a visual display device and a haptic device to a user. The computer program comprises computer program code which, when run on a haptic model generator causes the haptic model generator to: obtain information of at least one candidate virtual object, wherein the candidate virtual object includes both a haptic representation and a visual representation; determine, for each one of the at least one candidate virtual object, reachability data, indicating whether the candidate virtual object is reachable for the user; determine, for each one of the at least one candidate virtual object, visibility data, indicating whether the candidate virtual object is visible for the user; generate a haptic model selectively comprising at least one candidate virtual object, the inclusion of each candidate virtual object being based on its respective reachability data and visibility data; and provide the haptic model to be rendered by the haptic device.

According to a seventh aspect, it is presented a computer program product comprising a computer program according to the sixth aspect and a computer readable means on which the computer program is stored.

According to an eighth aspect, it is presented a system for generating a haptic model comprising a server comprising the haptic model generator and a user device comprising a haptic device configured to render the haptic model.

Generally, all terms used in the claims are to be interpreted according to their ordinary meaning in the technical field, unless explicitly defined otherwise herein. All references to "a/an/the element, apparatus, component, means, modules, step, etc." are to be interpreted openly as referring to at least one instance of the element, apparatus, component, means, modules, step, etc., unless explicitly stated otherwise. The steps of any method disclosed herein do not have to be performed in the exact order disclosed, unless explicitly stated.

BRIEF DESCRIPTION OF THE DRAWINGS

The example embodiments of the invention are now described, with reference to the accompanying drawings, in which.

DETAILED DESCRIPTION

Embodiments of the invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
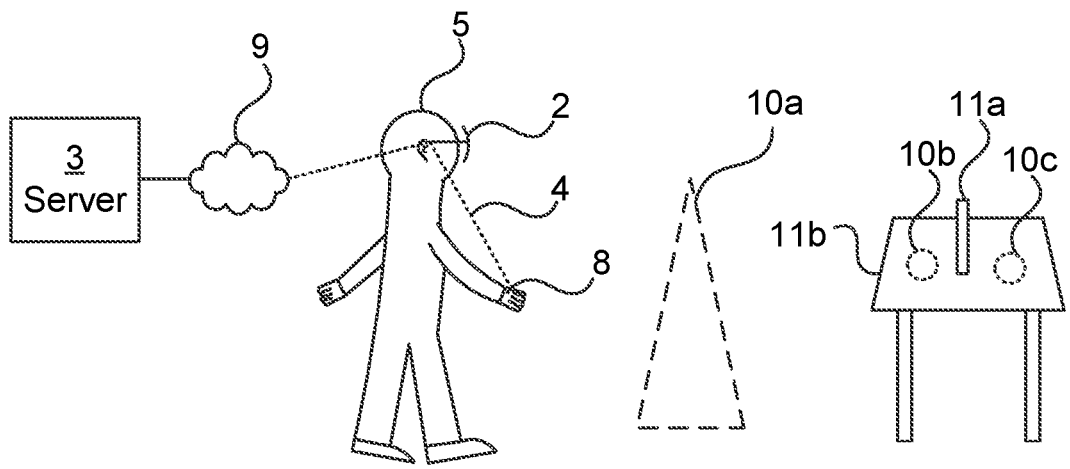
FIG. 1 is a schematic diagram illustrating an environment where embodiments presented herein can be applied.

FIG. 1 is a schematic diagram illustrating an environment where embodiments presented herein can be applied. A user 5 here wears a visual display device 2, such as a head mounted display (HMD), which allows the user 5 to see both real-world objects 11a-b and virtual objects 10a-c. Moreover, the user wears a haptic device 8, which allows the user to experience virtual objects haptically. Each virtual object 10a-c has both a visual representation and a haptic representation. The visual representation contains information about how the virtual object looks. The haptic representation contains information about shape and texture. Optionally, the haptic representation also contains information about additional aspects, such as temperature, weight, friction and stiffness. For instance, the haptic device 8 can be in the form of a glove with haptic feedback actuators, a kinesthetic device or a tactile smartphone. The haptic device 8 can communicate with the visual display device 2 over a wireless link 4. The haptic device 8 contains sensors (e.g. accelerometers, gyros, etc.) e.g. as part of an inertia measurement unit (IMU) to determine the position and orientation of the haptic device in a three dimensional space, to thereby determine when and how to haptically render any virtual objects within reach. Furthermore, a camera of the visual display device 2 can track the hands of the user in a reliable manner, also when the user wears a haptic device. Other methods to track the haptic device may be used, such as indoor positioning methods like Ultra Wide Band (UWB) localization (for the 3D position) and then use the IMU to know the orientation. Using the camera, the ability to determine the position of the haptic device is improved.

The virtual objects 10a-c do not exist in reality but are computer rendered and the real-world objects 11a-11b are physical objects which are not computer-rendered, i.e. not virtual. The virtual objects 10a-c are optionally configurable to never be haptically experienced. For instance, a virtual object being a screen rendering a video clip does not need to be haptically experienced and can instead benefit from not limiting movement or operations of the hands/limbs of the user. Using the visual display device 2 and the haptic device 8, the user 5 can both see and touch the virtual objects 10a-c. This combination is very powerful for the user experience. In this example, a first real-world object 11a is a table and a second real-world object is a screen divider 11a. Furthermore, there are three virtual objects 10a-c here: a first virtual object 10a in the form of a cone. A second virtual object 10b is in the form of a ball and a third virtual object 10c is also in the form of a ball. The screen divider 11a blocks the third virtual object 10c. Hence, even if the user 5 were to be standing by the table 11b, the user would not be able to reach the third virtual object 10c. As explained in more detail below, using the embodiments herein, both visibility and reachability data are used in order to exclude certain objects from a haptic model, where the haptic model contains all virtual objects to be haptically rendered by the haptic device 8.

The visual display device can e.g. be implemented using an HMD such as the Microsoft Hololens or Oculus Rift. It is also possible that the visual display device is implemented using a smartphone and/or a tablet computer. It is to be noted that the term 'computer' used herein is to be interpreted as any electronic device with digital processing capabilities, regardless of size. Hence, the term computer comprises devices such as servers, desktop computers, laptop computers, tablet computers, smart phones, mobile phones, smart watches, etc.

When the user 5 can experience a combination of real-world objects and computer-rendered content, the visual display device 2 and the haptic device 8 allows for a plethora of applications in the field often referred to augmented reality (AR). A similar environment is virtual reality (VR). However, in VR, the user essentially only experiences virtual objects, i.e. the visual display device 2 only renders virtual objects and blocks the vision of the user from seeing any real-world objects. However, the user would still feel the real-world objects 11a-b if the hand of the user is moved to touch one of the real-world objects 11a-b.

The visual display device 2 and the haptic device 8 are connected to a network 9. The network 9 can e.g. be a local area network (LAN) and/or a wide area network (WAN) such as the Internet. A server 3 is also connected to the network 9. The server 3 provides content for rendering by the visual display device 2 and the haptic device 8. The virtual objects 10a which are to be rendered by the haptic device form a haptic model. The haptic model is generated by a haptic model generator, which can form part of the server 3, the visual display device 2, the haptic device 8, or the haptic model generator can be a separate device.

While only three virtual objects 10a-c are shown in FIG. 1, there may be a great number of virtual objects in the haptic model. Each object can be very complex, both in terms of haptic and visual appearance. According to embodiments presented herein, a subset of the virtual objects can form part of the haptic model, to be haptically rendered based on visibility and reachability for the user 5.

Figure 2:
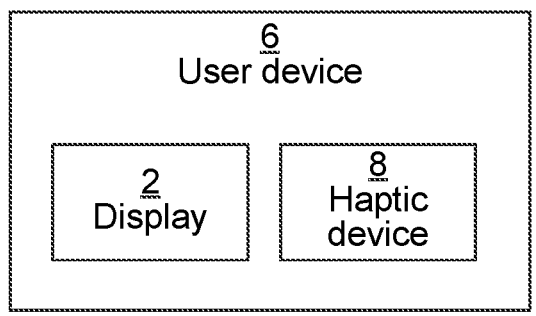
FIG. 2 is a schematic diagram illustrating components of a user device which can be applied in the environment of FIG. 1.

FIG. 2 is a schematic diagram illustrating components of a user device 6 which can be applied in the environment of FIG. 1. The visual display device 2 and the haptic device 8 are collectively denoted a user device 6. The user device 6 can be considered to be an AR device or a VR device. The user device 6 is used by the user to experience virtual objects both visually, using the visual display device 2, and haptically, using the haptic device 8. The user device 6 and the server 3 of FIG. 1 is here denoted a system.

Figure 3A:
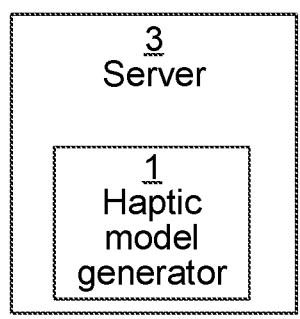
FIGS. 3A-B are schematic drawings illustrating embodiments of where the haptic model generator can be implemented.
Figure 3B:
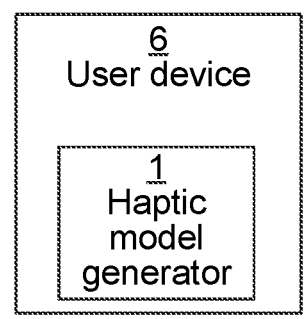

FIGS. 3A-B are schematic drawings illustrating embodiments of where the haptic model generator can be implemented. The haptic model generator can be applied in FIG. 1 to generate the haptic model used by the haptic device.

In FIG. 3A, the haptic model generator 1 is provided in the server 3.

In FIG. 3B, the haptic model generator 1 is provided in the user device 6. The haptic model generator 1 may then form part of the haptic device 8, the visual display device 2 or in a separate device forming part of the user device 6.

Figure 4:
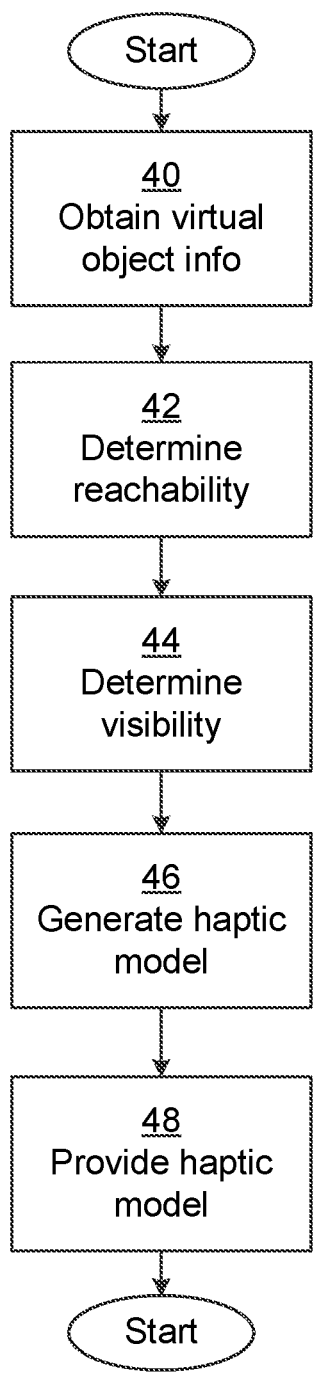
FIG. 4 is a flow chart illustrating embodiments of methods for generating a haptic model including at least one virtual object performed by the haptic model generator of FIGS. 3A-B.

FIG. 4 is a flow chart illustrating embodiments of methods for generating a haptic model including at least one virtual object performed by the haptic model generator of FIGS. 3A-B. As explained above, the at least one virtual object can be presented using both a visual display device and a haptic device to a user. The method can be performed by the server or in the user device.

In an obtain virtual object info step 40, information of at least one candidate virtual object is obtained. The candidate virtual object includes both a haptic representation and a visual representation. This information can e.g. be obtained from the server.

In a determine reachability step 42, reachability data is determining for each one of the at least one candidate virtual object. The reachability data indicates whether the candidate virtual object is reachable for the user. This depends on a position of the user and the position of the haptic device.

The determination of reachability data is optionally based on an orientation and position of a limb of the user (experiencing the haptic device) in relation to the candidate virtual object. For instance, when the haptic device is in the form of a glove, virtual objects on the open side of the hand of the user can be more easily reachable than virtual objects on the side of the back of the hand. Hence, considering orientation allows a more accurate determination of what virtual objects are reachable or not.

The determination of reachability data is optionally based on a direction of movement of a limb of the user experiencing the haptic device, in relation to the candidate virtual object. For instance, if the limb (e.g. hand or arm) is moving in a certain direction, virtual objects in that direction are more easily reachable than objects in the opposite direction, due to the inertia of movement of the limb.

The determination of reachability data is optionally based on how dynamic a movement of the limb of the user (experiencing the haptic device) is. In other words, if the limb is moving quickly, a region of reachability is greater than if the limb is completely still.

The determination of reachability data is optionally based on how dynamic a movement of the candidate virtual object is. Hence, if the virtual object is moving quickly, the virtual object may suddenly appear within reach of the user.

The determination of reachability data is optionally based on a detected activity of the user. For instance, if the detected activity task is a static task (e.g. sitting in the desk), the reachability region can be smaller, while if the user is performing a dynamic activity, such as playing sports, the reachability region can be larger.

Also, it may be that if a user is performing an activity A, the user might not want to feel objects for activity B. For example, if the user is working by a desk and there is a virtual object (e.g. a virtual puppy) just next to the chair, and the user for some reason moves his/her arms to touch it, the user might not want to get a haptic feedback since that will distract the user from his/her current activity of working.

The activity can be detected via sensors of user devices for example, motion sensors, visual sensors, WiFi signals, etc.

In a determine visibility step 44, visibility data is determined for each one of the at least one candidate virtual object. The visibility data indicates whether the candidate virtual object is visible for the user.

Optionally, any candidate virtual object is (i.e. all virtual objects are) determined to be not visible, which is visually blocked by a real-world object situated between the user and the perceived position of the candidate virtual object. For instance, the third virtual object 10c of FIG. 1 would thereby be determined to be not visible.

The definition of the viewable and reachable regions can e.g. be given by cones with given aperture angles from the body position of the user. In other embodiments, the definition of the viewable and reachable areas, may be given by other regular or irregular geometric shapes.

The angles, distances and regions for the limits of reachability and visibility may be manually adjusted by the user (with or without visual representation of such regions at the configuration step), or these regions may be adapted automatically, based on the inferred user body position and arm reach (the arm length, common user movements, etc.) for defining the physically reachable areas. Optionally, the user eye (focus area) is tracked and/or field of view limitations of the visual display device are considered, to further adapt the region of visibility.

In one embodiment, the regions of visibility and reachability are dependent on application and/or user context. For instance, this can depend on when the user is sitting on a chair and working at a desk, walking outdoor or indoor, etc. since in each of these scenarios, the viewable and reachable regions vary.

In a generate haptic model step 46, a haptic model selectively comprising at least one candidate virtual object, is generated. The inclusion (or exclusion) of each candidate virtual object is based on both its respective reachability data and visibility data.

Optionally, the generation of the haptic model comprises generating a model which excludes all candidate virtual objects which are considered unreachable.

Optionally, the generation of the haptic model comprises generating a model which excludes all candidate virtual objects which are considered not visible.

Optionally, the generation of the haptic model comprises generating a model which excludes candidate virtual objects which are not considered to be in focus for the user. In other words, if the user is looking far left, virtual object on the far right could be excluded from the haptic model.

In a provide haptic model step 48, the haptic model is provided to be rendered by the haptic device. The haptic device is then able to haptically render the virtual object(s) forming part of the haptic model. Any virtual object not part of the haptic model will not be haptically rendered by the haptic device.

The frequency of which the method is performed can be based on a position and/or movement of the user. For instance, when the user is moving quickly, the method can be repeated often to adapt to a changing haptic environment.

By generating the haptic model based on visibility and reachability for the user, many resources are saved. Processing requirements and bandwidth requirements are reduced.

This also reduces power requirements, prolonging battery life for the visual display device and the haptic device.

The haptic model is performed on demand, whereby the amount of haptic data processing can be tailored based on the current visibility and reachability status of each virtual object.

Figure 5:
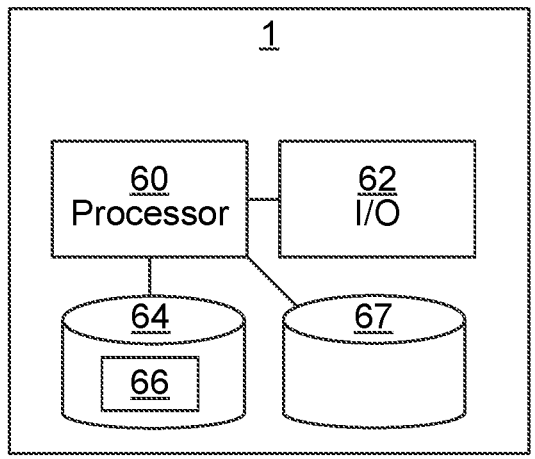
FIG. 5 is a schematic diagram illustrating components of the haptic model generator of FIGS. 3A-B.

FIG. 5 is a schematic diagram illustrating components of the haptic model generator 1 of FIGS. 3A-B. It is to be noted that the haptic model generator 1 may share one or more of these components with a host device, e.g. the server 3 or the user device 6.

A processor 60o is provided using any combination of one or more of a suitable central processing unit (CPU), multi-processor, microcontroller, digital signal processor (DSP), application specific integrated circuit etc., capable of executing software instructions 66 stored in a memory 64, which can thus be a computer program product. The processor 60o can be configured to execute the method described with reference to FIG. 4 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 67 is also provided for reading and/or storing data during execution of software instructions in the processor 6o. The data memory 67 can be any combination of read and write memory (RAM) and read only memory (ROM).

The haptic model generator 1 further comprises an I/O interface 62 for communicating with other external entities.

Other components of the haptic model generator 1 are omitted in order not to obscure the concepts presented herein.

Figure 6:
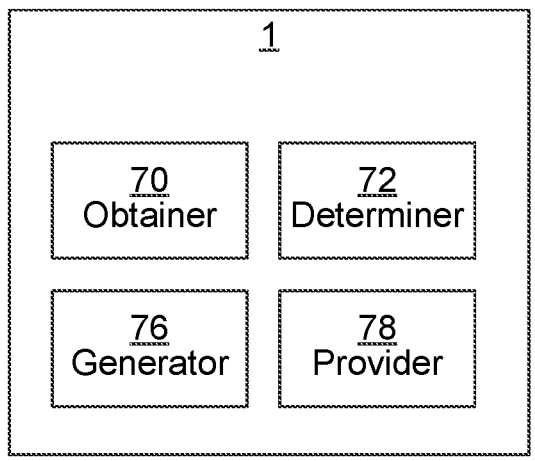
FIG. 6 is a schematic diagram showing functional modules of the haptic model generator of FIGS. 3A-B according to one embodiment.

FIG. 6 is a schematic diagram showing functional modules of the haptic model generator of FIGS. 3A-B according to one embodiment. The modules are implemented using software instructions such as a computer program executing in the haptic model generator. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the method illustrated in FIG. 4.

An obtainer 70 corresponds to step 40. A determiner 72 corresponds to steps 42 and 44. A generator 76 corresponds to step 46. A provider 78 corresponds to step 48.

Figure 7:
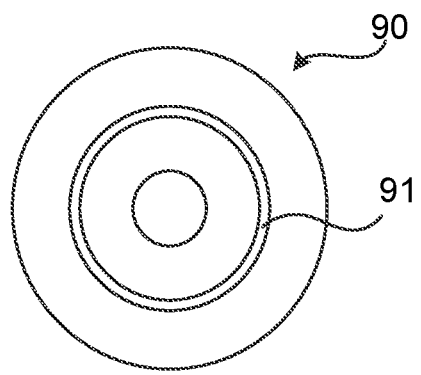
FIG. 7 shows one example of a computer program product comprising computer readable means.

FIG. 7 shows one example of a computer program product comprising computer readable means 90. On this computer readable means 90 a computer program 91 can be stored, which computer program 91 can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The embodiments of the invention have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for generating a haptic model including at least one virtual object which can be presented to a user wearing both a visual display device and a haptic device, the visual display device enabling the user to see both real-world objects and the at least one virtual object and the haptic device enabling the user to haptically experience the at least one virtual object, the method being performed by a haptic model generator and comprising:

obtaining information of at least one candidate virtual object, wherein the candidate virtual object includes both a haptic representation and a visual representation;

determining, for each one of the at least one candidate virtual object, reachability data, indicating whether the candidate virtual object is reachable for the user based on a position of the user and a position of the haptic device in relation to a position of the one of the at least one candidate virtual object, wherein determining the reachability data comprises determining at least one of: i) an orientation and position and ii) a direction of movement of a limb of the user, experiencing the haptic device, in relation to the at least one candidate virtual object;

determining, for each one of the at least one candidate virtual object, visibility data, indicating whether the candidate virtual object is visible for the user based on a position of the user in relation to a position of the one of the at least one candidate virtual object, wherein determining the visibility data comprises determining any candidate virtual object to be not visible when the candidate virtual object is visually blocked by a real-world object situated between the user and a perceived position of the at least one candidate virtual object;

generating the haptic model containing all virtual objects having haptic representations to be haptically rendered by the haptic device, the haptic model selectively comprising a haptic representation of the at least one candidate virtual object, wherein an inclusion or exclusion of certain virtual objects from the haptic model is based on, for each certain virtual object of the certain virtual objects, reachability data and visibility data of the certain virtual object, wherein generating the haptic model comprises generating a model which excludes all candidate virtual objects which are considered unreachable and which excludes all candidate virtual objects which are considered not visible by being visually blocked by the real-world object; and providing the haptic model to be rendered by the haptic device, wherein the haptic device renders the haptic representation of the at least one virtual object forming part of the haptic model.

2. The method according to claim 1, wherein a frequency of performing the method is based on a position of the user.

3. The method according to claim 1, wherein the haptic model generator is provided in a server.

4. The method according to claim 1, wherein the haptic model generator is provided in a user device comprising the haptic device.

5. The method of claim 1 wherein the limb comprises at least one of an arm, a hand, and fingers.

6. A haptic model generator for generating a haptic model including at least one virtual object which can be presented to a user wearing both a visual display device and a haptic device, the visual display device enabling the user to see both real-world objects and the at least one virtual object and the haptic device enabling the user to haptically experience the at least one virtual object, the haptic model generator comprising:
- a processor; and
- a memory storing instructions that, when executed by the processor, cause the haptic model generator to,
  - obtain information of at least one candidate virtual object, wherein the candidate virtual object includes both a haptic representation and a visual representation,
  - determine, for each one of the at least one candidate virtual object, reachability data, indicating whether the candidate virtual object is reachable for the user based on a position of the user and a position of the haptic device in relation to a position of the one of the at least one candidate virtual object, wherein determining the reachability data comprises determining at least one of: i) an orientation and position and ii) a direction of movement of a limb of the user, experiencing the haptic device, in relation to the at least one candidate virtual object,
  - determine, for each one of the at least one candidate virtual object, visibility data, indicating whether the candidate virtual object is visible for the user based on a position of the user in relation to a position of the one of the at least one candidate virtual object, wherein determining the visibility data comprises determining any candidate virtual object to be not visible when the candidate virtual object is visually blocked by a real-world object situated between the user and a perceived position of the candidate virtual object,
  - generate the haptic model containing all virtual objects having haptic representations to be haptically rendered by the haptic device, the haptic model selectively comprising a haptic representation of the at least one candidate virtual object, wherein an inclusion or exclusion of certain virtual objects from the haptic model is based on, for each certain virtual object of the certain virtual objects, reachability data and visibility data of the certain virtual object, wherein generating the haptic model comprises generating a model which excludes all candidate virtual objects which are considered unreachable and which excludes all candidate virtual objects considered to be not visible when the candidate virtual object is visually blocked by the real-world object, and
  - provide the haptic model to be rendered by the haptic device, wherein the haptic device haptically renders the haptic representation of the at least one virtual object forming part of the haptic model.

7. The haptic model generator according to claim 6, further comprising instructions that, when executed by the processor, cause the haptic model generator to repeat execution of instructions at a frequency based on a position of the user.

8. The haptic model generator according to claim 6, wherein the instructions to generate a haptic model comprise instructions that, when executed by the processor, cause the haptic model generator to generate a model which excludes candidate virtual objects which are not considered to be in focus for the user.

9. The haptic model generator according to claim 6, wherein the instructions to determine reachability data comprise instructions that, when executed by the processor, cause the haptic model generator to determine reachability data based on how dynamic a movement of a limb of the user, experiencing the haptic device, is.

10. The haptic model generator according to claim 6, wherein the instructions to determine reachability data comprise instructions that, when executed by the processor, cause the haptic model generator to determine reachability data based on how dynamic a movement of the candidate virtual object is.

11. The haptic model generator according to claim 6, wherein the instructions to determine reachability data comprise instructions that, when executed by the processor, cause the haptic model generator to determine reachability data based on a detected activity of the user.

12. A computer program product comprising a computer program according to claim 6 and a non-transitory computer readable means on which the computer program is stored.

13. A system for generating the haptic model comprising a server comprising the haptic model generator according to claim 6 and a user device comprising a haptic device configured to render the haptic model.

14. The haptic model generator of claim 6 wherein the limb comprises at least one of an arm, a hand, and fingers.

* * * * *

UNITED STATES PATENT AND TRADEMARK OFFICE
CERTIFICATE OF CORRECTION

PATENT NO. : 11,079,848 B2
APPLICATION NO. : 16/467092
DATED : August 3, 2021
INVENTOR(S) : Araújo et al.

It is certified that error appears in the above-identified patent and that said Letters Patent is hereby corrected as shown below:

In the Specification

Column 2, Line 7, delete "tables" and insert -- tablets --, therefor.

Column 9, Line 12, delete "60$o$" and insert -- 60 --, therefor.

Column 9, Line 17, delete "60$o$" and insert -- 60 --, therefor.

Column 9, Line 28, delete "6$o$." and insert -- 60. --, therefor.

Signed and Sealed this
Seventeenth Day of May, 2022

Katherine Kelly Vidal
*Director of the United States Patent and Trademark Office*